(12) United States Patent
Schluter (10) Patent No.: US 8,070,404 B1
(45) Date of Patent: Dec. 6, 2011

(54) BONDING FASTENER ASSEMBLY FOR ELECTRICAL GROUNDING

(75) Inventor: Robert Schluter, Kinnelon, NJ (US)

(73) Assignee: Middle Atlantic Products, Inc., Fairfield, NJ (US)

( * ) Notice: Subject to any disclaimer, the term of this patent is extended or adjusted under 35 U.S.C. 154(b) by 290 days.

(21) Appl. No.: 12/386,710

(22) Filed: Apr. 21, 2009

Related U.S. Application Data (60) Provisional application No. 61/198,540, filed on Nov. 6, 2008.

(51) Int. Cl.
*F16B 33/00* (2006.01)

(52) U.S. Cl. ......................................... 411/368; 411/531

(58) Field of Classification Search ................... 411/368, 411/534, 983
See application file for complete search history.

(56) References Cited

U.S. PATENT DOCUMENTS

| | | | | |
|---|---|---|---|---|
| 296,948 | A * | 4/1884 | Gilgour | 411/123 |
| 641,376 | A * | 1/1900 | Dodridge | 411/123 |
| 643,485 | A * | 2/1900 | Edmondson | 411/123 |
| 2,069,402 | A * | 2/1937 | Cowlin | 411/154 |
| 2,271,732 | A * | 2/1942 | Chappuis | 411/158 |
| 2,372,653 | A * | 4/1945 | Becket | 439/412 |
| 2,523,652 | A * | 9/1950 | Dowd et al. | 36/59 R |
| 3,761,867 | A * | 9/1973 | Churla | 439/413 |
| 5,069,589 | A * | 12/1991 | Lemke | 411/533 |
| 5,487,685 | A * | 1/1996 | Stillback et al. | 439/801 |
| 5,658,108 | A * | 8/1997 | Swick | 411/368 |
| 6,082,942 | A * | 7/2000 | Swick | 411/368 |
| 2006/0257229 | A1 | 11/2006 | Bucciferro et al. | |

OTHER PUBLICATIONS

Tapped Rail Bonding Stud Kits-Panduit Network and Electrical Solutions; http://www.panduit.com/Products/ProductOverviews/ProductSearch/index.htm; Aug. 14, 2008; 1 pg.
Panduit Corp. Tinley Park, Illinois; Tapped Rail Bonding Stud Kits, Customer Drawing, No. C41700; Feb. 2007; 1 pg.

* cited by examiner

*Primary Examiner* — Gary Estremsky
(74) *Attorney, Agent, or Firm* — Drinker Biddle & Reath LLP (57) ABSTRACT

A fastener assembly comprising a fastener with a head having a first surface and second surface, and a shaft extending from the second surface of the head. An annular washer is rotatably disposed about the shaft and rotatable relative to the second surface of the fastener head. The washer has an inner diameter, an outer diameter, a first surface and a second, the first surface being positioned adjacent to the second surface of the head. A plurality of identical conical projections extend out from the second surface of the washer and are formed integrally therewith.

19 Claims, 8 Drawing Sheets

BONDING FASTENER ASSEMBLY FOR ELECTRICAL GROUNDING

RELATED APPLICATION

This application is related to and claims priority from U.S. Provisional Application No. 61/198,540, filed on Nov. 6, 2008, which is incorporated herein by reference in its entirety.

FIELD OF THE INVENTION

The present invention relates to an attachment or fastening system for use in securing two or more structures and, more particularly, to a fastening system for providing electrical conductivity through the secured structures after attachment.

BACKGROUND

There are a number of fasteners on the market for securing multiple structures together. In certain structural connections, however, it is important to provide an electrical connection or bond between the structures. This is particularly important in situations were a grounded condition is needed.

For example, in equipment enclosure racks, such as audio or computer equipment racks, grounding through multiple racks is generally required. Since many racks have a protective paint coating, the direct attachment using conventional nuts and bolts is not, in some cases, sufficient to provide an electrical connection. As such, in order to provide adequate grounding, separate grounding wires are typically used to provide electrical continuity. One end of the grounding wire is attached to a stud or post and the other end is attached to a grounding bus bar mounted to the rack. While this type of attachment is adequate for providing electrical grounding, the attachment of the grounding wires is time consuming and subject to error should the ground connection not be properly completed.

A product that was recently introduced by Panduit Corporation is referred to as the Tapped Rail Bonding Stud Kit and includes a nut and bolt arrangement with serrations or teeth formed integral to and on the bottom of the nut and bolt. That product is described in detail in U.S. Patent Publication No. 2006/0257229.

While the Panduit product does address the problem for breaking through the paint layer to reach the base metal, Applicant has determined that the product negatively impacts the appearance of the components and can create a corrosion source since the serrations are designed to remove a complete circular ring of paint exposing the bare metal. The ring of bare metal is susceptible to corrosion unless an anti-oxidant is applied. However, application of anti-oxidants is an additional assembly step and can be difficult to apply.

SUMMARY OF THE INVENTION

A fastener assembly is disclosed that includes a fastener with a head having a first or top surface for engagement by an attachment tool, and second or bottom surface opposite the first surface. A shaft extends out from the second surface of the head and is threaded along at least a portion of the shaft. An annular washer is rotatably disposed about the shaft and rotatable relative to the second surface of the fastener head. The washer a planar body with an inner diameter, an outer diameter, a first surface and a second surface opposite the first surface, the first surface of the washer being positioned adjacent to the second surface of the head. A plurality of substantially identical conical projections extend out from the second surface of the washer and are formed integrally therewith.

In one embodiment, the fastener is a bolt and the assembly further includes a nut. The nut has a first surface for engagement by an attachment tool, and a substantially flat second surface. The second surface faces the second surface of the head and the second surface of the annular washer. A second annular washer is disposed about the shaft and rotatable relative to the second surface of the nut and the shaft. The second washer has an inner diameter, an outer diameter, a first surface and a second surface opposite the first surface. The first surface of the washer is positioned adjacent to the second surface of the nut. A plurality of substantially identical conical projections extend out from the second surface of the second washer and are formed integrally therewith.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention there is shown in the drawings various forms which are presently preferred; it being understood, however, that this invention is not limited to the precise arrangements and instrumentalities particularly shown.

DETAILED DESCRIPTION

Figure 1:
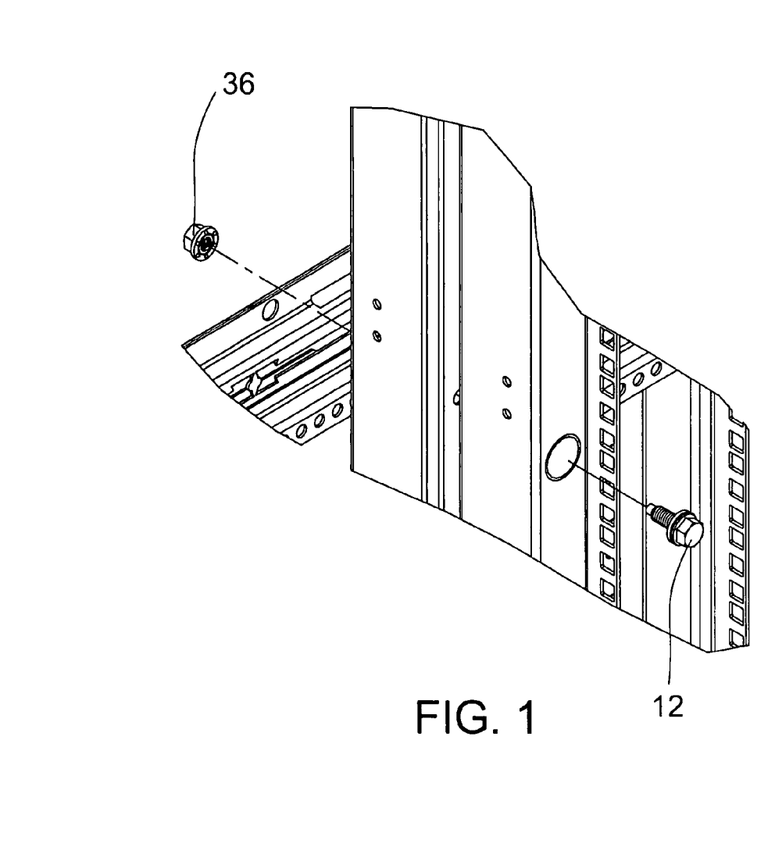
FIG. 1 is a perspective view of a portion of two adjacent racks being attached together with a bonding fastener assembly according to the present invention.
Figure 2:
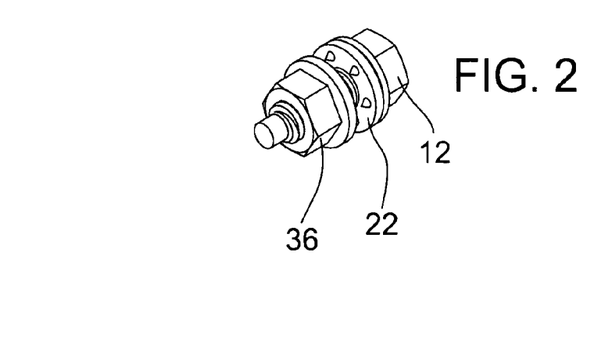
FIG. 2 is an isometric view of a bonding fastener assembly according to one embodiment of the invention.
Figure 3:
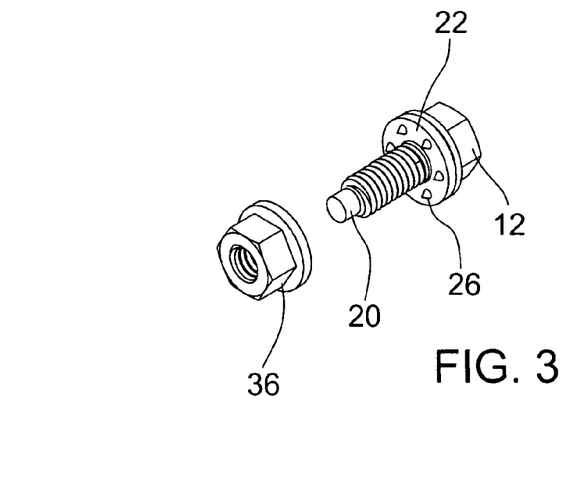
FIG. 3 is an isometric view of the bonding fastener assembly of FIG. 2 disassembled.

FIG. 1 illustrates one embodiment of the bonding fastener assembly 10 of the present invention as it is contemplated for use in attaching two rack assemblies. As shown in FIGS. 1-3, the bonding fastener assembly 10 includes a fastener 12 with a head 14, including a top surface 16 and bottom surface 18, a shaft 20 and a spiked washer 22. The top surface 16 of the head 14 has a conventional configuration designed to be engaged with a common installation tool. For example, the head may include a recess for receiving a Phillips head screwdriver, or may have a polygonal shape for engagement with a suitable ratchet. The various configurations that the top surface can be formed in are well known to those skilled in the art and, therefore, no further discussion is needed. The bottom surface 18 of the head 14 is preferably flat. The shaft 20 is integral with the head 14 and extends from the second surface. The shaft 20 includes threads on at least a portion of its surface for engagement with a mating nut or for self tapping into a metal component in a conventional manner.

The spiked washer 22 is shown in detail in FIGS. 2-6. The spiked washer includes a substantially planar annular ring base 24 with a plurality of conical protrusions or spikes 26 projecting out from one face 28 of the washer 22. The opposite face 30 does not have any protrusions and, instead, provides a relatively smooth surface for the bottom surface 18 of the head to slide along as will be explained in more detail below. The location and number of the spikes 26 may vary, although the location and number should be chosen so as to provide reliable displacement of and penetration into the painted surface during use and to provide sufficient electrical conductivity through the connection. Substantially even spacing of the spikes around the bottom surface will assist in the washer seating properly with the connecting surface (i.e., lying flat on top of the surface being connected.)

Figure 5:
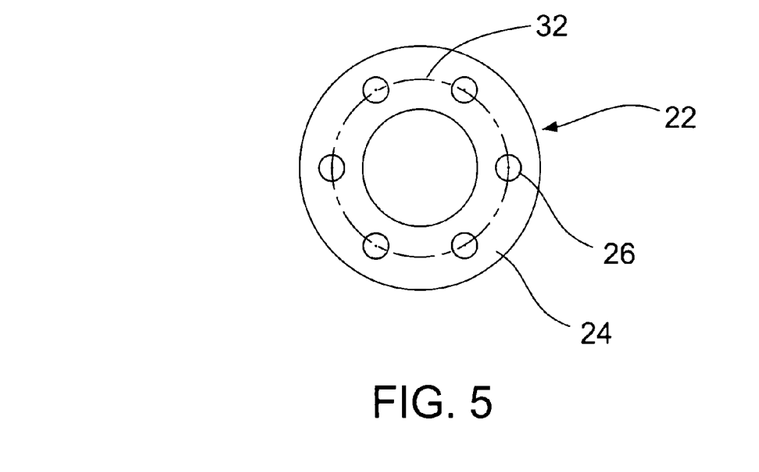
FIG. 5 is a top view of the spiked washer according to one embodiment of the invention.
Figure 6:
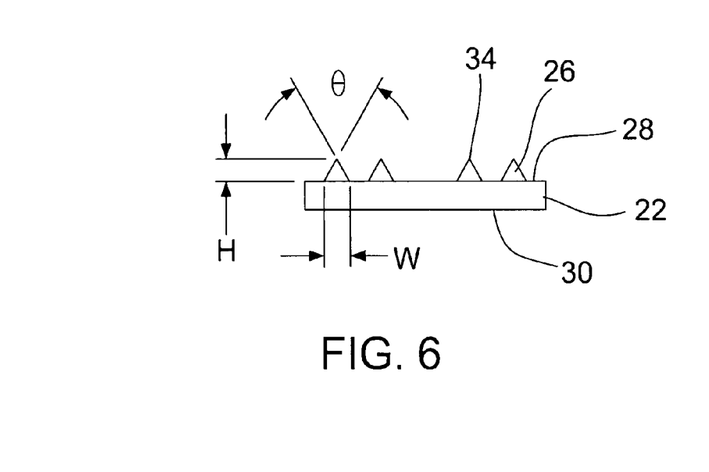
FIG. 6 is a side view of the spiked washer of FIG. 5.

In the illustrated embodiment, there are approximately six spikes 26 formed on the bottom surface, evenly spaced about a medial circumference 32 of the washer 22 with a median diameter of approximately 0.50 inches for the illustrated washer 22 that has an overall outer diameter of 0.680 inches and an inner diameter of 0.325 inches. The location of the spikes 26 at this position provides more reliability that the loads imposed on the washer during tightening of the fastener will translate substantially directly through the spikes as an axial piercing force into the painted surface, thereby displacing and penetrating the paint locally and embedding the spikes into the underlying metal material. In another embodiment, the spikes are equally spaced about a circumference that is radially inward but close to the outer edges of the washer. In one embodiment, the washer 22 is made from stainless steel with a thickness of approximately $1/16^{th}$ inch. This is sufficiently thick enough to prevent deforming of the washer during attachment. Deformation is not desired since it can cause the spikes to not embed properly and, thus cause the washer to spin as it is tightened.

As discussed above, the spikes 26 are preferably formed integral with the washer 22. In one preferred embodiment, the washers 22 are cast or formed in a die with the spikes 26 from a high strength electrically conductive material, such as steel, powdered metal, or other well known electrically conductive materials. It is also contemplated that the washer could be formed using a stamping or machining process. As should be evident from the above discussion, the washer 22 should be manufactured with a suitable hardness and stiffness to achieve the desired penetration. If the spikes are too hard, they can break. However, if the spikes are too soft they may deform during tightening and fail to penetrate into the base metal. Thus, proper hardening is needed. This can be achieved though a hardening or heat treat process after the spikes are formed. Preferably the washer is manufactured such that the spikes have a Rockwell hardness of between 30 and 80 (on the C scale) with a more preferred Rockwell hardness of approximately 58. In one preferred embodiment, the washer 22 is formed using a die punching process. A blank washer is placed on a die with appropriately shaped cavities in the die that have a contour configured to form the spikes. A punch is pressed down onto the opposite side of the washer forcing a portion of the material of the washer to flow into the cavities, thereby forming the spikes.

The spikes 26 preferably have a height H from the flat face 28 of about 0.062 inches and have a width W of about 0.072 inches at the flat surface, tapering preferably uniformly to the tip 34. Thus, in one embodiment, the cone has an inclusive angle θ of approximately 60 degrees. The shape and size of the spikes may vary, however the spikes must have a sufficiently sharp tip or edge to sever the painted surface. Also, the inclusive angle must be sufficiently small to provide the sharp piercing point, while still providing sufficient strength so as not to break during installation. A preferred angle θ in the present invention is between about 20 degrees and 120 degrees. More preferably, the inclusive angle is between 30 degrees and 80 degrees. Any narrower than 20 degrees could lead to premature breakage of the spike. Any larger than 120 degrees can lead to the spike failing to sufficiently penetrate the painted layer.

Figure 4:
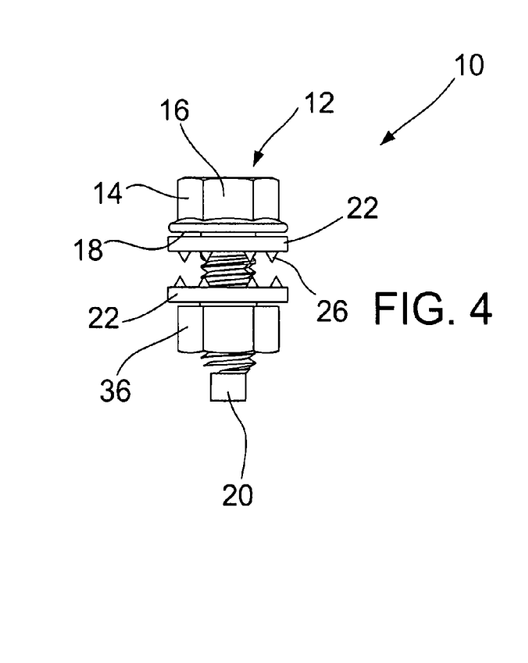
FIG. 4 is a side view of the bonding fastener assembly of FIG. 2.

As shown in FIG. 4, when used in conjunction with a bolted fastener assembly (i.e., with a bolt 12 and nut 36) two spiked washers 22 are preferably used, one on either side of the installation with the spikes 26 facing one another. The assembly, when tightened, will break through the painted surfaces from both sides, thus providing electrical continuity. It is also contemplated that the fastener may be a screw or other fastener, instead of the illustrated bolt.

Figure 8:
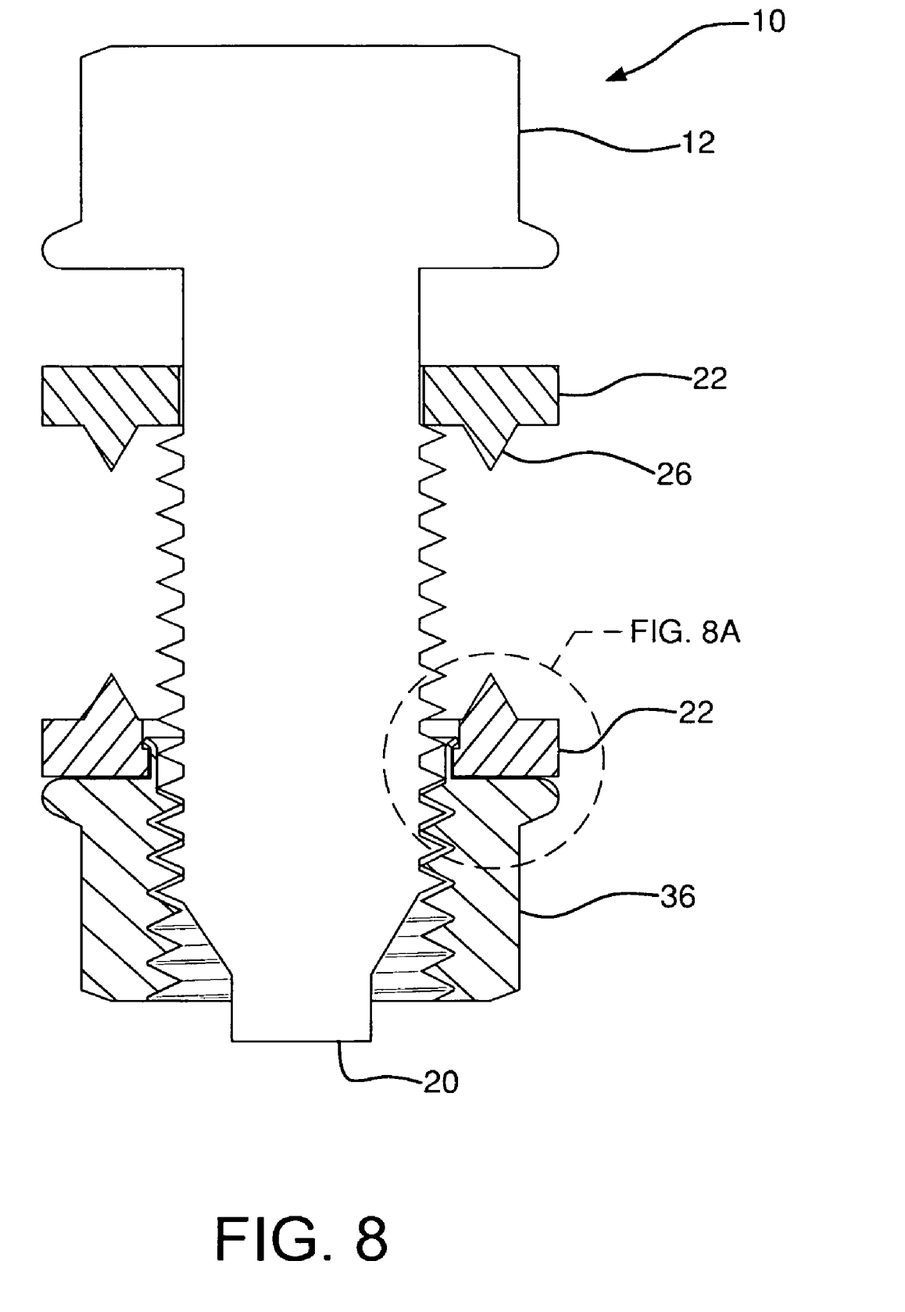
FIG. 8 is a cross-section of a fastener and nut illustrating the retention of the spiked washers in one embodiment.
Figure 8A:
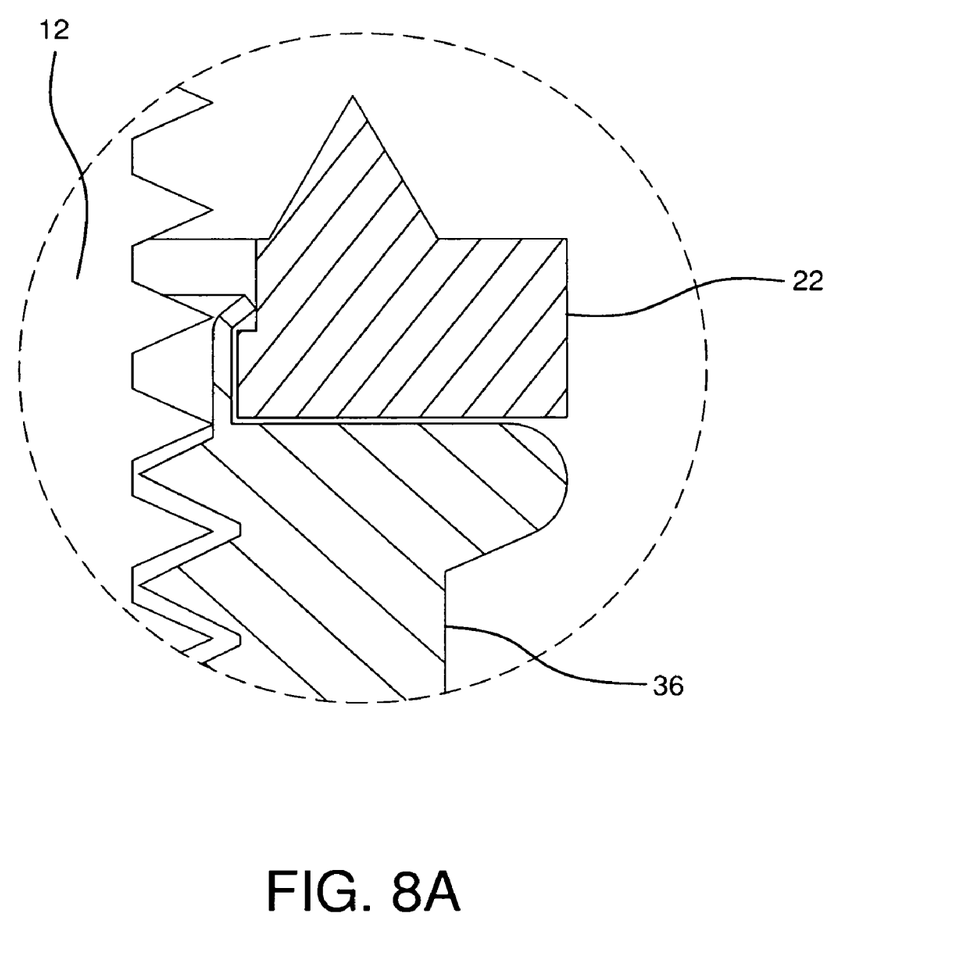
FIG. 8A is an enlargement of a portion of the washer.

In one preferred embodiment of the invention, it is contemplated that the washer 22 is attached to at least the bolt 12, yet free to rotate about the shaft. For example, a retention clip may be attached to the washer 22 or the shaft 20 and designed to retain the washer on the shaft so that it cannot readily slip off. The attachment would, however, permit the washer to rotate relative to the head so that when the head is tightened, the washer does not rotate. More preferably, as shown in FIG. 8, the shaft or shank 20 of the bolt preferably includes a non-threaded portion adjacent to the head 14. The washer 22 is free to rotate about the non-threaded portion. The washer 22 may be retained on the non-threaded portion simply by threading the washer onto the shaft until it reaches the non-threaded portion. More preferably, the spiked washer is placed on the non-threaded portion prior to threading of the shaft 20. Threads are then formed on the shaft 22 in a conventional manner. The formation of the threads results in the threads having an outer diameter that is greater than the diameter of the non-threaded portion and the inner diameter of the washer 22. As such, the washer 22 is retained on the bolt. In one embodiment, the non-threaded portion of the shaft has a length of approximately $5/32^{nd}$ inch and the washer 22 has a thickness of approximately $1/16^{th}$ inch, thus resulting in the washer having approximately $3/32^{nd}$ inch gap to float along the shaft 20.

As also shown in FIG. 8, a second washer 22 is also preferably retained on the nut 36. In one embodiment, this is achieved by forming the nut with an annular extension with a diameter that is less than the inner diameter of the washer. The washer 22 is placed on the extension and the extension is then swaged outward to form a retention lip. The retention lip retains the washer onto the nut while permitting the washer to rotate relative to the nut. In one embodiment, in order to prevent the lip from interfering with the spikes, the washer on the nut is formed with a recessed inner ring with a thickness of approximately $1/32^{nd}$ inch and a diameter of approximately $7/16^{th}$ inch. The annular extension is swaged into a lip that preferably sits within the recessed area. The lip is preferably raised slightly off of the recessed area so that the washer can be rotated relative to the nut while still retained by the lip from separating.

One of the unique and unexpected aspects of the invention shown in FIG. 8 is the ability to tighten a bolted assembly from only one side. More particularly, the user inserts the bolted attachment through a hole between two components. The nut, including its retained washer, is threaded onto the opposite end of the shaft until the spikes engage the surface of the second component. At this point, since the washer adjacent to the nut is attached to the nut, the tightening of the bolt causes the nut to bear into the washer. The spikes on the washer inhibit rotation of the washer and nut, thus holding the nut in place as the bolt is tightened. Hence, the bolted assembly can be tightened from one side, making attachment of rack assemblies easier and quicker.

Since the nut in the above discussion is not required to interact with a tool, it is possible that, instead of the hexagonal nut shown in the figures, a round nut could be used so as to reduce the desire by the installer to use a tool and potentially damage the painted surface. Also, it may be desirable to form the nut and spiked washer as a integral unit or eliminate the nut altogether and simply thread the inner diameter of the washer.

Figure 7A:
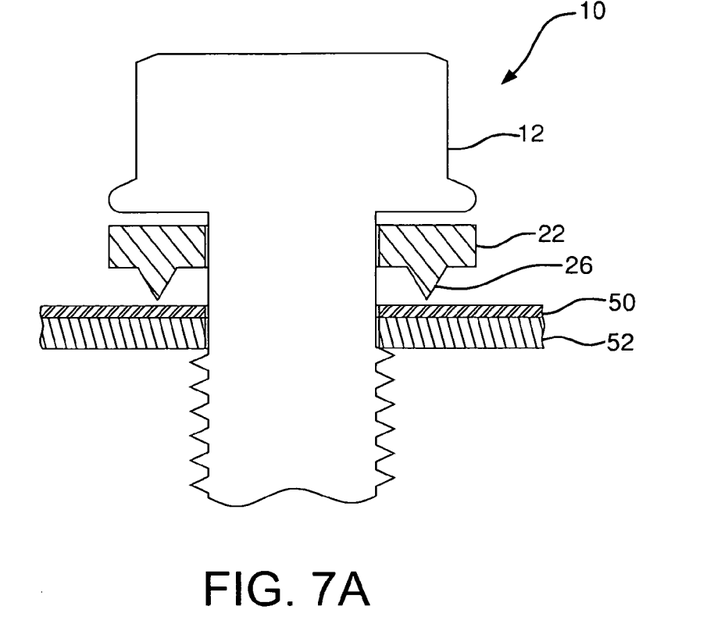
FIGS. 7A-7E illustrate the how the present invention penetrates the paint coating to form an electrical connection.
Figure 7B:
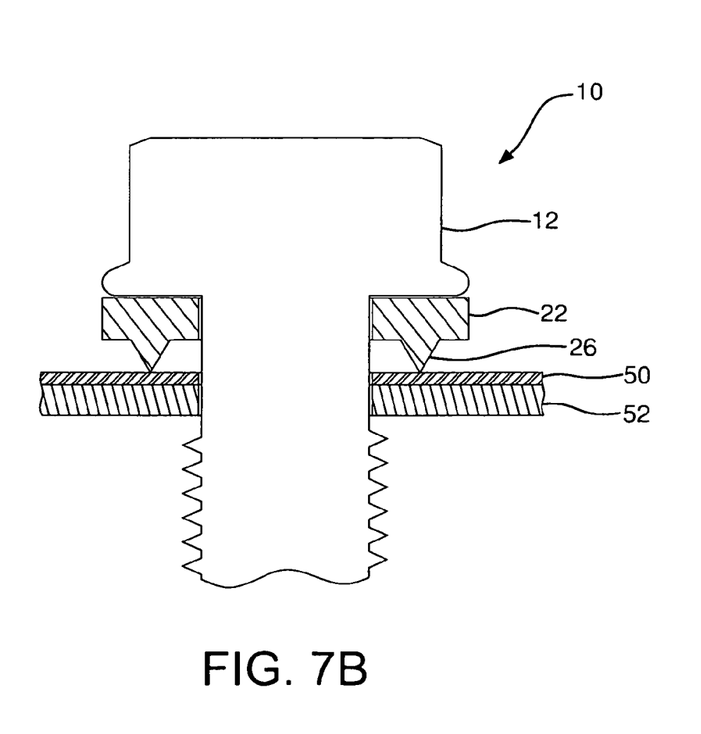
Figure 7C:
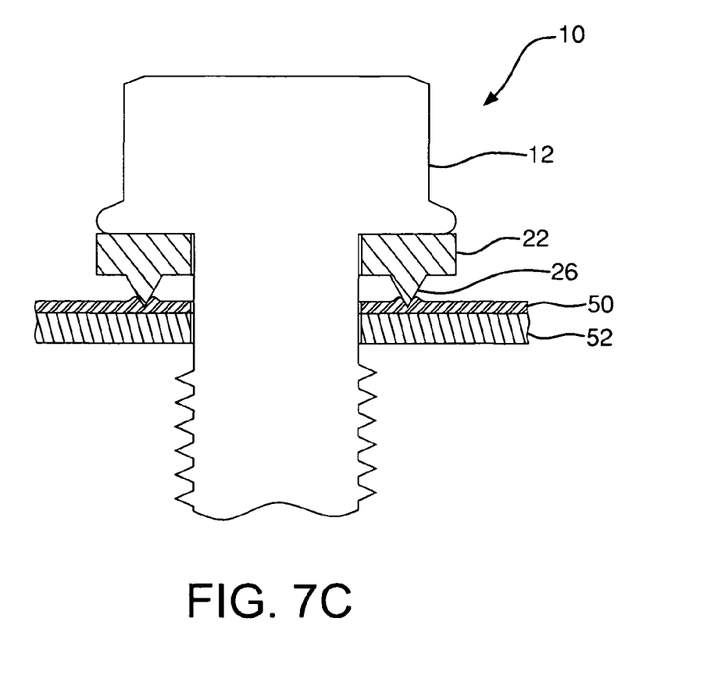
Figure 7D:
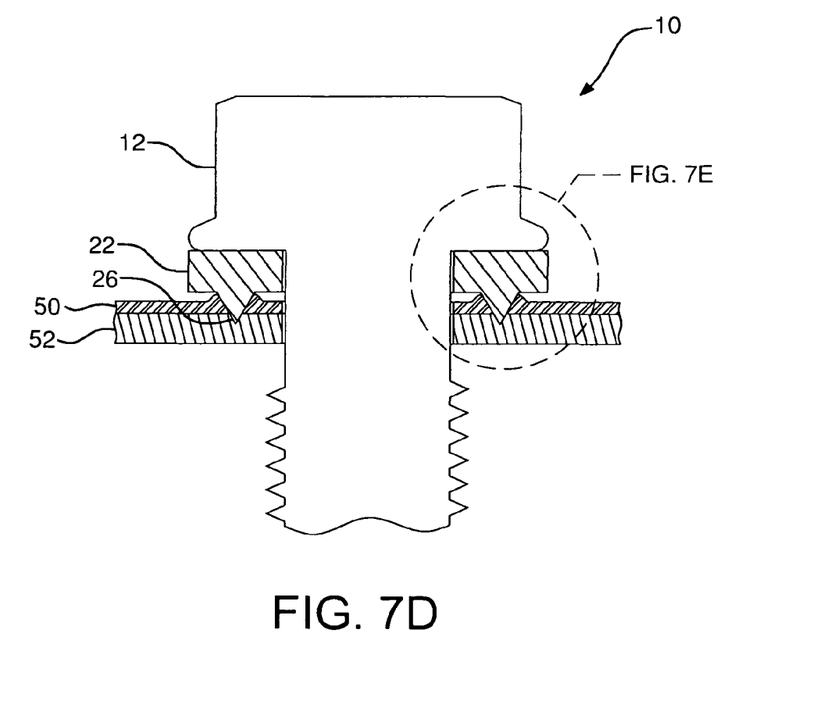
Figure 7E:
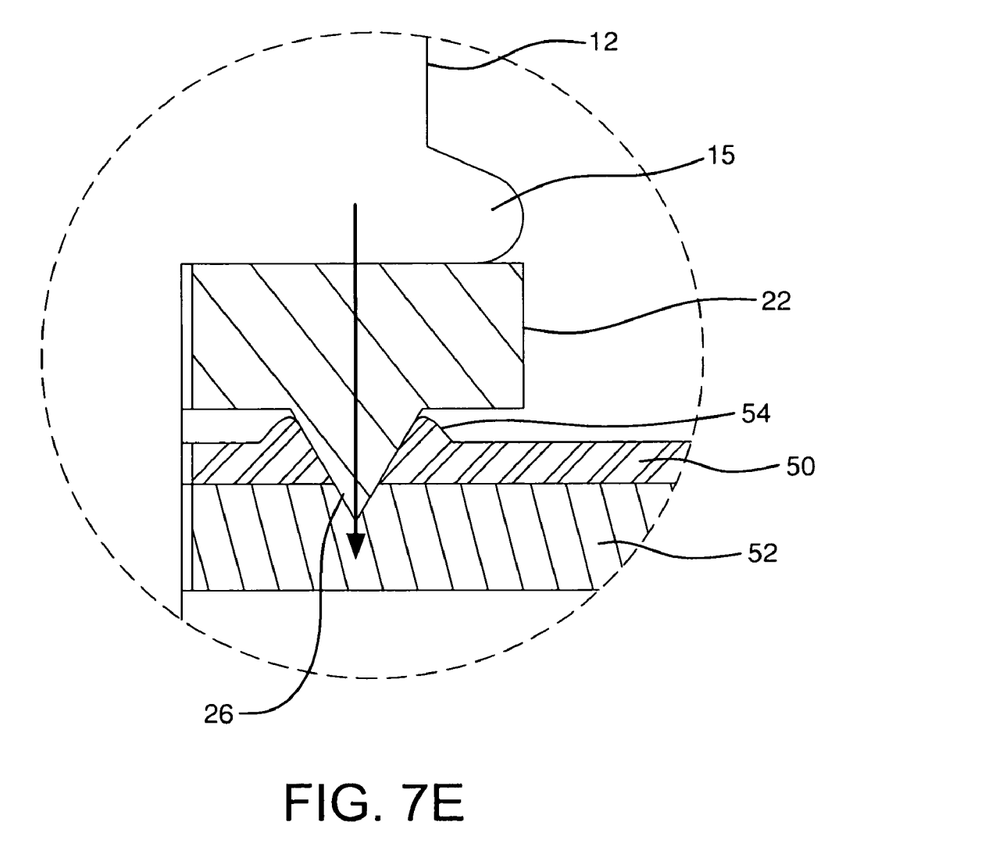

The hardware is manufactured in such a way as to allow the spikes to remain rotationally stationary, while the screw (bolt) and nut are tightened. In this way, the paint is displaced by the spike locally without disturbing the adjacent painted surfaces, thus preventing an annular ring of paint removal. Referring to FIGS. 7A-7E, the installation of a fastener according to the present invention is shown. FIG. 7A shows the initial touch-down of the spiked washer 22 onto the painted surface 50. As the fastener is tightened, the floating gap between the head 14 and the washer is eliminated (FIG. 7B). Further tightening of the fastener causes the spikes be begin to penetrate the painted surface 20, displacing the paint 54 (FIG. 7C). The fastener is tightened until the spikes penetrate through the painted surface and into the base metal 52 (FIG. 7D). FIG. 7E illustrates how the displaced painted coating 54 forms a seal against the side surfaces of the spikes 26. As a result, the present invention provides a corrosion resistant seal without the need for separate anti-corrosion chemical pastes.

Figure 9A:
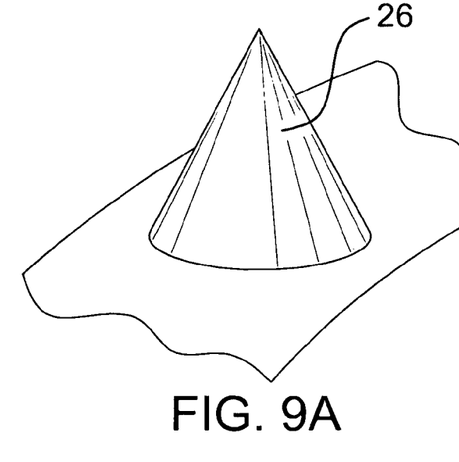
FIGS. 9A-9C illustrate different shape spikes for the washer of FIG. 2.
Figure 9B:
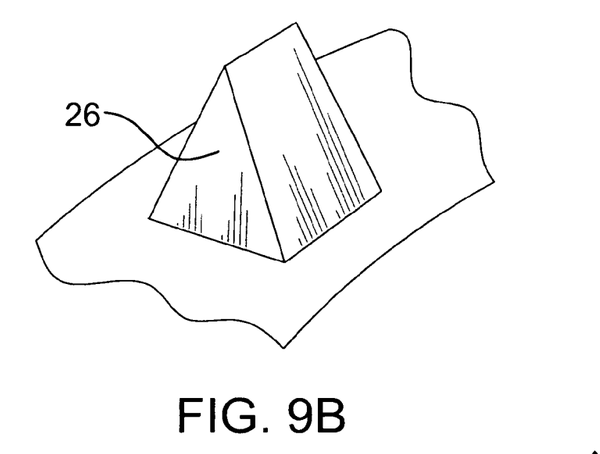
Figure 9C:
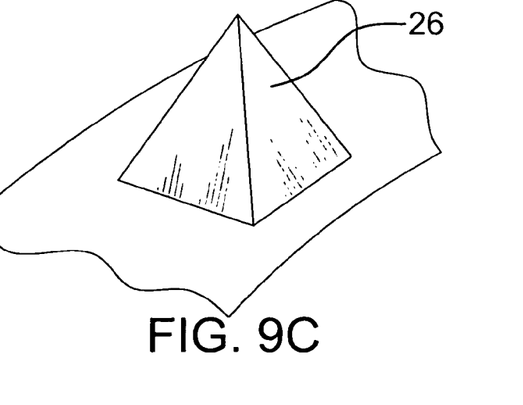

Although the preferred embodiment is a conical shaped spike, such as the one shown in FIG. 9A, it should be apparent from the above discussion that a pyramidal (three, four or more sided) structure can be used as the spike provided the tip is designed to penetrate and displace the painted coating as it extends into the base metal. FIG. 9C shows an example of a pyramidal shaped spike. Furthermore, while a pointed spike is preferable, the spike can instead form a knife edge, such as the linear edge shown in FIG. 9B. The knife edge is designed to dig into the painted coating during tightening, displacing the paint and penetrating into the base metal.

Also, it is preferable for the bolt head 14 and the nut 36 to have a base portion 15 that is flared outward as shown in FIG. 8. This produces a full thrust bearing force acting on the washer and spikes as the bolt and nut are tightened. That is, the tightening force is transmitted axially into the spikes (shown by the arrow). As such, the penetrating of the painted surface by the spikes is more efficient since less force it transmitted to the surrounding portion of the washer. Also, there is less of a tendency for the tightening forces to produce distortion of the washer from its planar arrangement. Distortion can lead to the spikes failing to dig into the painted coating and, instead, "skipping" on the surface.

The present invention provides a system for use in "ganging" equipment enclosures together, while at the same time providing a continuous and reliable path for electrical ground faults, high frequency leakage currents, and electrically bonding multiple enclosures together to form an extension of the "ground plane".

The present invention can also be used to electrically bond loose sheet metal accessories such as doors, tops, sides, etc. It eliminates the need to mask studs or screw landings pre-paint.

Variations, modifications and other implementations of what is described herein will occur to those of ordinary skill in the art without departing from the spirit and scope of the invention. Accordingly, the invention is in no way limited by the preceding illustrative description.

What is claimed is:

1. A fastener assembly for securing two or more structures and providing electrical grounding to the secured structures after attachment, the fastener assembly comprising:
    a fastener with a head having a first surface for engagement by a fastening tool, second surface on the opposite side of the head from the first surface, and a shaft extending outward from the second surface of the head; and
    an annular electrically conductive washer rotatably disposed about the shaft and rotatable relative to the second surface of the fastener head, the washer having an inner diameter, an outer diameter, a first surface and a second surface located on the opposite side of the washer from the first surface, the first surface being positioned adjacent to the second surface of the head, the combination of the first surface of the washer and the second surface of the head providing a low friction interface so that the head can rotate relative to the washer, and approximately six substantially identical pointed projections extending out from the second surface of the washer and formed integrally therewith, the pointed projections adapted to penetrate into the structure being secured;
    wherein the projections are conically shaped and substantially equally spaced about the washer at a common radius so that the pointed projections lie substantially on a medial circumference.

2. The fastener assembly of claim 1, wherein the projections have a height of approximately 0.062 inches and have a tip end with an inclusive angle of between approximately 20 degrees and 120 degrees.

3. The fastener assembly of claim 2, wherein the inclusive angle is between approximately 30 degrees and 80 degrees.

4. The fastener assembly of claim 3, wherein the inclusive angle is approximately 60 degrees, and wherein the projection has a Rockwell hardness of approximately 58 on the Rockwell C scale.

5. The fastener assembly of claim 1, each projection having a height of approximately 0.062 inches and have a tip end with an inclusive angle of approximately 60 degrees, the washer having a thickness of approximately 0.0625 inches.

6. The fastener assembly of claim 1 wherein the shaft includes a non-threaded portion located adjacent to the head, and wherein the washer is located about the non-threaded portion of the shaft and retained on the fastener such that the washer can rotate about the shaft but cannot be readily removed off of the shaft.

7. The fastener assembly of claim 6 wherein the washer is retained on the shaft by the threads.

8. The fastener assembly of claim 1, wherein the fastener is a bolt and the assembly further comprises a nut, the nut having a first surface for engagement by an attachment tool, and a substantially flat second surface on the opposite side of the nut from the first surface, the second surface of the nut facing the second surface of the head and the second surface of the washer.

9. A fastener assembly for securing two or more structures and providing electrical grounding to the secured structures after attachment, the fastener assembly, the fastener assembly comprising:
    a bolt with a head having a first surface for engagement by a fastening tool, second surface on the opposite side of the head from the first surface, and a shaft extending outward from the second surface of the head; and a first annular electrically conductive washer rotatably disposed about the shaft and rotatable relative to the second surface of the fastener head, the washer having an inner diameter, an outer diameter, a first surface and a second surface located on the opposite side of the washer from the first surface, the first surface being positioned adjacent to the second surface of the head, the combination of the first surface of the first washer and the second surface of the head providing a low friction interface so that the head can rotate relative to the first washer, and a plurality of substantially identical pointed projections extending out from the second surface of the first washer and formed integrally therewith, the pointed projections adapted to penetrate into the structure being secured;

a nut having a first surface for engagement by an attachment tool, and a substantially flat second surface on the opposite side of the nut from the first surface, the second surface of the nut facing the second surface of the head and the second surface of the first washer;

a second annular washer rotatably disposed about the shaft and rotatable relative to the second surface of the nut, the second washer having an inner diameter, an outer diameter, a first surface and a second surface on the opposite side of the second washer from the first surface, the first surface of the second washer being positioned adjacent to the second surface of the nut, and a plurality of substantially identical pointed projections extending out from the second surface of the second washer and formed integrally therewith.

10. The fastener assembly of claim 9, wherein the second washer is retained on the nut such that the second washer can rotate relative to the nut but cannot be readily removed off of the nut.

11. The fastener assembly of claim 10, wherein the nut includes a tubular extension that extends out from the second surface of the nut, the distal end of the tubular extension being swaged radially outward to form a lip, the second washer being located between the lip and the second surface of the nut, such that the second washer is retained on the nut by the lip.

12. The fastener assembly of claim 9, wherein the projections have a height of approximately 0.062 inches and have a tip end with an inclusive angle of between approximately 20 degrees and 120 degrees.

13. The fastener assembly of claim 12, wherein the inclusive angle is between approximately 30 degrees and 80 degrees.

14. The fastener assembly of claim 13, wherein the inclusive angle is approximately 60 degrees, and wherein the projection has a Rockwell hardness of approximately 58 on the Rockwell C scale.

15. The fastener assembly of claim 9, each projection having a height of approximately 0.062 inches and have a tip end with an inclusive angle of approximately 60 degrees, the washer having a thickness of approximately 0.0625 inches.

16. The fastener assembly of claim 9, wherein the shaft includes a non-threaded portion located adjacent to the head, and wherein the washer is located about the non-threaded portion of the shaft and retained on the fastener such that the washer can rotate about the shaft but cannot be readily removed off of the shaft.

17. The fastener assembly of claim 16, wherein the washer is retained on the shaft by the threads.

18. A fastener assembly for securing two or more structures and providing electrical grounding to the secured structures after attachment, the fastener assembly comprising:

an electrically conductive bolt with a head having a first surface for engagement by a fastening tool, second surface on the opposite side of the head from the first surface, and a shaft extending outward from the second surface of the head; and a first annular electrically conductive washer rotatably disposed about the shaft and rotatable relative to the fastener head, the washer having a first surface positioned adjacent to and in electrical contact with the second surface of the head, a second surface located on the opposite side of the washer from the first surface, and a plurality of substantially identical sharp projections extending out from the second surface of the washer and formed integrally therewith, the sharp projections being adapted to penetrate into one of the structures being secured;

an electrically conductive nut having a substantially flat surface facing the second surface of the head and the second surface of the first washer, the nut being adapted to be engaged in electrical contact with the bolt; and a second annular electrically conductive washer rotatably retained on the nut, the second washer having a first surface positioned adjacent to and in electrical contact with the second surface of the nut, a second surface on the opposite side of the second washer from the first surface, and a plurality of substantially identical sharp projections extending out from the second surface of the second washer and formed integrally therewith, the sharp projections being adapted to penetrate into the other of the structures being secured.

19. A method of forming a fastener assembly according to claim 9, the fastener for securing two or more structures and providing electrical grounding to the secured structures after attachment, the method comprising the steps of:

providing a fastener according to claim 9;

providing an annular washer having an inner diameter, an outer diameter, a first surface and a second surface located on the opposite side of the washer from the first surface;

placing the second surface of the washer on a die having a plurality of cavities formed therein, each cavity with a conically shaped contour and being substantially equally spaced about the washer at a common radius so that the pointed projections lie substantially on a medial circumference;

driving a punch into the first surface of the washer to force a portion of the washer into each cavity, the combination of the punch and cavity forming conical projections on the washer; and placing the washer on the shaft of the fastener with the first surface of the washer adjacent to the second surface of the head of the fastener to form the fastener assembly.

* * * * *